United States Patent
Boeck

(10) Patent No.: US 10,415,430 B2
(45) Date of Patent: Sep. 17, 2019

(54) COUPLING ASSEMBLY FOR COMPONENTS OF CERAMIC MATRIX COMPOSITES FOR A TURBINE CENTER FRAME

(71) Applicant: MTU Aero Engines AG, Munich (DE)

(72) Inventor: Alexander Boeck, Kottgeisering (DE)

(73) Assignee: MTU Aero Engines AG, Munich (DE)

( * ) Notice: Subject to any disclaimer, the term of this patent is extended or adjusted under 35 U.S.C. 154(b) by 417 days.

(21) Appl. No.: 15/479,498

(22) Filed: Apr. 5, 2017

(65) Prior Publication Data
US 2017/0298774 A1    Oct. 19, 2017

(30) Foreign Application Priority Data

Apr. 5, 2016  (EP) ..................................... 16163769

(51) Int. Cl.
*F16B 5/06* (2006.01)
*F01D 25/24* (2006.01)
*F01D 25/00* (2006.01)

(52) U.S. Cl.
CPC ......... *F01D 25/243* (2013.01); *F01D 25/005* (2013.01); *F01D 25/246* (2013.01);
(Continued)

(58) Field of Classification Search
CPC .... F01D 25/243; F01D 25/246; F01D 25/005; F01D 9/023; F05D 2300/6033; F05D 2260/30; F02C 7/20; Y02T 50/672; F16B 5/02; F16B 5/0241; F16B 5/06; F16B 5/0607; F16B 5/0614
See application file for complete search history.

(56) References Cited

U.S. PATENT DOCUMENTS 1,676,289 A * 7/1928 Schmalz ................. B25B 5/105
269/210
4,109,860 A * 8/1978 Serafin .................... E01B 9/303
238/349
(Continued)

FOREIGN PATENT DOCUMENTS

DE      102014210182 A1  10/2015
EP          1249621 B1   10/2002
(Continued)

*Primary Examiner* — Peter J Bertheaud
*Assistant Examiner* — Dnyanesh G Kasture
(74) *Attorney, Agent, or Firm* — Davidson, Davidson & Kappel, LLC

(57) ABSTRACT

A coupling assembly, including a first component and a second component overlapping in a join region; a joining device allowing the first and second components to rest against each other clampingly and region; the joining device including a clamp resting on the first component and the second component and having a bolt connection adapted for securing the clamp to the first and second component. The first and second components are manufactured from a ceramic matrix composite; the first component having a holding portion including a front side facing the clamp, a rear side facing away from the clamp, and a receiving opening; and the bolt connection having a bolt portion that extends through the receiving opening and, at the end thereof facing away from the clamp, having a bracing portion angled relative to the longitudinal axis of the bolt portion and that rests against the rear side.

15 Claims, 1 Drawing Sheet

(52) U.S. Cl.
 CPC .. *F05D 2260/30* (2013.01); *F05D 2300/6033* (2013.01); *Y02T 50/672* (2013.01)

(56) References Cited

U.S. PATENT DOCUMENTS

| | | | |
|---|---|---|---|
| 4,387,941 A * | 6/1983 | Maier | A61G 15/14 312/194 |
| 6,648,597 B1 * | 11/2003 | Widrig | C04B 37/001 415/200 |
| 7,021,855 B2 * | 4/2006 | Hardtke | F16B 2/065 403/168 |
| 7,237,388 B2 | 7/2007 | Aumont et al. | |
| 8,061,977 B2 | 11/2011 | Keller et al. | |
| 8,459,624 B2 | 6/2013 | Klippel et al. | |
| 2009/0208284 A1 | 8/2009 | Funnell | |
| 2011/0008163 A1 | 1/2011 | Prentice | |
| 2015/0252691 A1 | 9/2015 | Sasse et al. | |
| 2015/0377068 A1 | 12/2015 | Eichinger et al. | |

FOREIGN PATENT DOCUMENTS

| | | |
|---|---|---|
| EP | 1607582 | 12/2005 |
| EP | 2604805 | 6/2013 |
| EP | 2784333 A1 | 10/2014 |
| EP | 2952699 A1 | 12/2015 |
| WO | WO2015/031764 | 3/2015 |
| WO | WO2015/065563 | 5/2015 |

\* cited by examiner

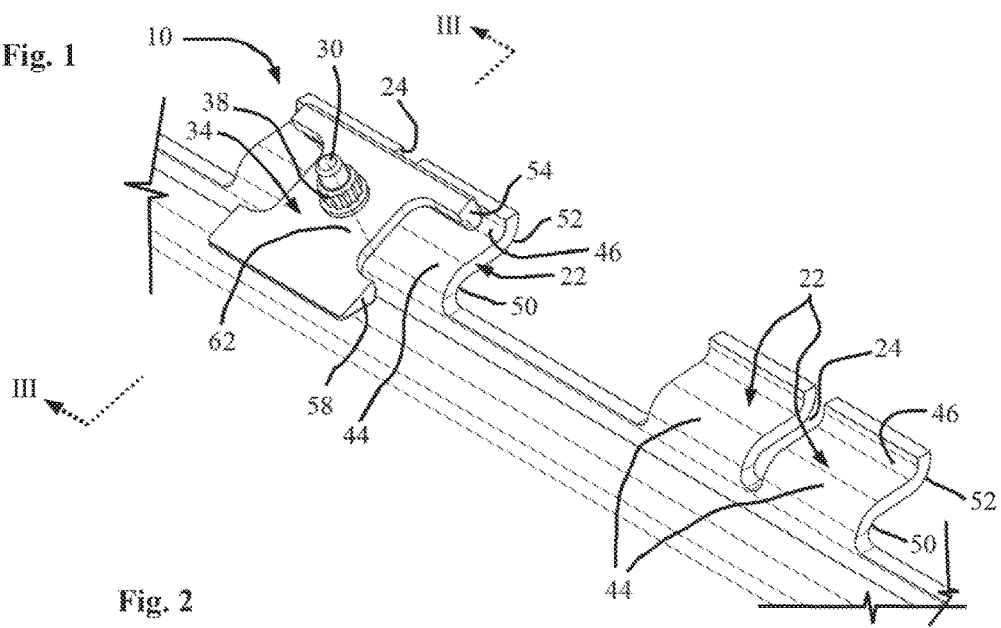
Fig. 1
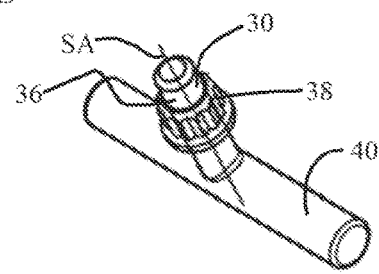
Fig. 2
Fig. 3
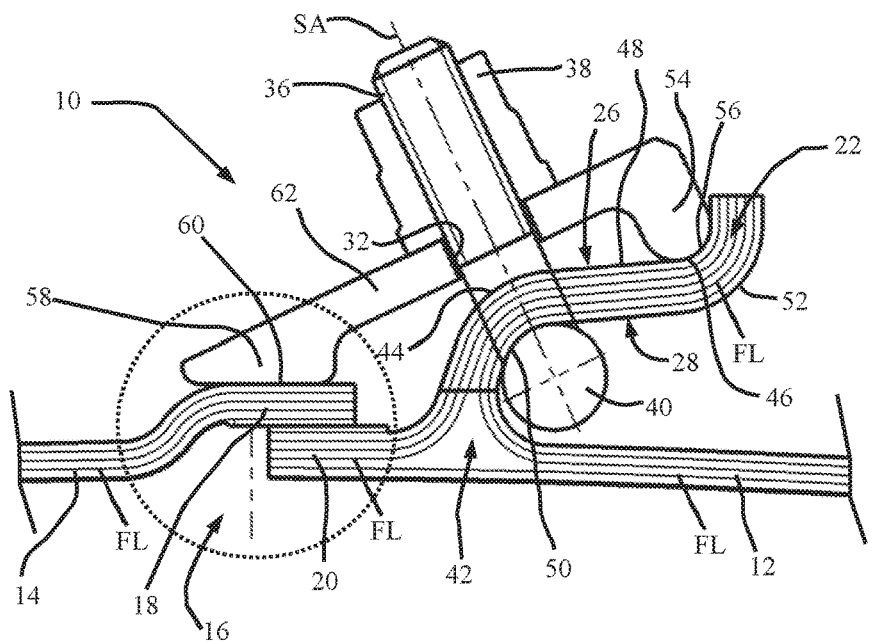

COUPLING ASSEMBLY FOR COMPONENTS OF CERAMIC MATRIX COMPOSITES FOR A TURBINE CENTER FRAME

This claims the benefit of European Patent Application EP16163769.9, filed Apr. 5, 2016 and hereby incorporated by reference herein.

The present invention relates to a coupling assembly including a first and a second component, the first and the second component being configured to overlap one another in a join region; a joining means that is in contact with the first and the second component in a way that allows the first and second component to rest against each other clampingly in the join region, the joining means including a clamp that rests on the first and second component; and a bolt connection that is adapted for securing the clamp to the first and second component.

BACKGROUND

To secure a rotor bearing of a gas turbine, in particular an aircraft gas turbine, struts are installed in the area of a turbine center frame, also knows an intermediate turbine housing, between an engine housing and an annular supporting structure. These struts extend through a hot gas-conducting annular duct. Since the turbine exhaust gas (hot gas) must cross this strut structure in the annular duct, for example, to reach a low-pressure turbine and must not thereby wet the bearing structures, these structures, respectively struts are covered by contoured panels and aerodynamic strut fairings. The entire covering structure is thereby attached by hooks to the frame, radially inner panels being held by the strut fairing. The panels are thereby attached to the strut fairings by an overlap region (ground overlap) and bolted-on clamps. The bolt connections thereby have a stay bolt that is soldered into the strut fairing.

To reduce the weight and enhance the efficiency of gas turbines, in particular of aircraft gas turbines, but also of other machines, largely manufactured from metal under known methods heretofore, efforts are underway to replace metallic components with components made of ceramic matrix composites (CMC). The existing method of soldering on a stay bolt does not allow the above described frame panels and strut fairings to be manufactured from CMC because soldering is not possible when working with CMC components.

SUMMARY OF THE INVENTION

It is an object of the present invention to provide a coupling assembly that will overcome the above disadvantages.

To achieve this objective, it is provided that the first and second component be manufactured from a ceramic matrix composite or composites (CMC), the first component having a holding portion including a front side facing the clamp, a rear side facing away from the clamp, and a receiving opening, and that the bolt connection have a bolt portion that extends through the receiving opening and that, at the end thereof facing away from the clamp, have a bracing portion that is angled, in particular extends orthogonally relative to the longitudinal axis of the bolt portion, and that rests against the rear side of the holding portion.

The bracing portion of the bolt portion engages behind the holding portion, enabling the clamp to be secured to the holding portion. The bolt portion is not permanently joined to the holding portion or to the first component, so that there is no need for a material-to-material bond, such as in the case of the known soldering on of a stay bolt between the first component and the bolt portion. Thus, with the assistance of the clamp, the holding portion and the bolt portion are able to produce a connection between two components of a ceramic matrix composite.

It is also provided that, along the front side thereof, the holding portion have a convex portion and a concave portion; the clamp being braced against the concave portion of the front side. It is also preferred that the holding portion have a concave portion and a convex portion along the rear side thereof, the bracing portion of the bolt connection being braced against the concave portion of the rear side. The concave, respectively convex portions on the front side, respectively the rear side are complementary; i.e., a concave portion on the rear side of the holding portion may be associated with the convex portion on the front side, and vice versa. Due to the successive form of a convex portion and a concave portion on the front side, respectively of a concave portion and a convex portion on the rear side, the holding portion has a curved or S-shaped form. Between the curved portions, the holding portion preferably still features a straight portion, so that the curved portions do not merge directly into one another.

The respective concave portions on the front and rear side allow the clamp, respectively the bracing portion of the bolt to be received positively, in particular.

It is also preferred that the opening of the holding portion feature a slotted design having an open end in a way that allows the bolt portion to be introduced through the open end into the slotted opening. The slotted opening allows the bolt portion to be introduced; the bracing portion of the bolt being able to be passed along the rear side of the holding portion and then rest against the holding portion to the side of the slotted opening. The slotted opening simplifies the insertion of the bolt portion. In addition, even in the joined state, the slotted opening allows a relative movement between the bolt portion and the holding portion, in particular as a function of the acting forces.

It is also provided that the clamp feature a first bearing portion that faces the holding portion of the first component and that has a first clamping face that, in particular, rests on the concave portion of the front side, the first clamping face preferably being curved, in particular being convexly shaped. In particular, the first clamping face has a form that is complementary to the concave portion of the front side of the holding portion, besides a non-positive connection, a positive connection thereby being made possible.

It is also preferred that the clamp have a second bearing portion that faces the join region and that has a second clamping face that rests on the second component, the second clamping face preferably having an essentially flat form. The second clamping face exerts a clamping force on the join region where the first and second component overlap, so that the first component and the second component are pressed against each other, and a seal-tight connection of the two components is made possible in the join region.

It is also provided that the clamp have a central portion that joins the first bearing portion and the second bearing portion, the central portion featuring a top side that faces away from the holding portion and that is substantially flat. The central portion preferably includes the opening through which the bolt portion extends. The part of the bolt portion that passes through the opening and extends above the top side of the central portion preferably has an external thread, upon which a nut having an internal thread may be or is bolted. In the tightened state of the bolt connection, the nut rests on the top side of the central portion of the clamp. In the tightened state of the coupling assembly, the clamp is positioned and clamped in place, thus between the nut and the bracing portion of the bolt portion, allowing it to press by the two clamping faces thereof against the holding portion, respectively the join region in order to secure the two components to one another.

To ensure that the acting forces are able to be absorbed and transmitted, it is preferred that the fiber layers of the ceramic matrix composite (CMC) be placed in the holding portion to extend continuously therethrough. The preloading force of the holding portion may be hereby maintained in cases of wear or thermal influences.

Another aspect of the present invention also relates to a turbine center frame of a gas turbine, in particular of aircraft gas turbine, having a hot gas-conducting annular duct, including at least one first frame element, in particular a fairing of the turbine center frame; at least one second frame element, in particular a panel of a turbine center frame. It is thereby provided that the turbine center frame have at least one coupling assembly having at least one of the features described above, the first frame element forming the first component of a ceramic matrix composite (CMC), and the second frame element forming the second component of a ceramic matrix composite (CMC).

It is thereby preferred that the join region between the first frame element and the second frame element seal the hot gas-conducting annular duct. This sealing is accomplished by the overlapping of the two frame elements and the clamping force exerted by the coupling assembly with the assistance of the holding portion, the clamp, and the bolt portion.

Finally, the present invention also relates to a gas turbine, in particular an aircraft gas turbine having such a turbine center frame.

BRIEF DESCRIPTION OF THE DRAWINGS

The present invention will be explained exemplarily in the following with reference to the appended figures, without being limited thereto.

In a simplified and schematic perspective representation, FIG. 1 shows a first component, in particular a part of a strut fairing of a turbine center frame of a gas turbine, exemplarily having two holding portions and exemplarily one clamp.

In an enlarged, schematic perspective representation, FIG. 2 shows a bolt connection of the coupling assembly.

FIG. 3 shows a schematic cross section through the coupling assembly, approximately along the line of intersection in FIG. 1.

DETAILED DESCRIPTION

A coupling assembly 10, that is readily apparent in FIGS. 1 and 3 and is described in the following with reference to these two figures, includes a first component 12 and a second component 14 that are only shown in FIG. 3. The two components 12, 14 are manufactured from ceramic matrix composites. First component 12 is preferably a first frame element, in particular a fairing or a strut fairing of a turbine center frame. The second component 14 is preferably a second frame element, in particular a panel of the turbine center frame that bounds a hot gas-conducting annular duct.

First component 12 and second component 14 mutually overlap in a join region 16. An overlapping portion 18 of second component 14 rests on overlapping portion 20 of first component 12. A sealing is achieved at the transition between the two components 12, 14 by the overlapping of the two components 12, 14 in join region 16.

Discernible on first component 12 in FIG. 1 are two holding portions 22 that are integrally formed in one piece thereon. Holding portion 22 has an elongated opening 24 that may also be referred to as a slotted opening. Holding portion 22 features a front side 26 and a rear side 28. A bolt connection, in particular bolt portion 30 thereof, is received in opening 24. Bolt portion 30 extends upwardly through an opening 32 in a clamp 34 that rests on second component 14 and holding portion 22. In upper part thereof that faces away from holding portion 22, bolt portion 30 features a threaded portion or an external thread. A nut 38 having a corresponding internal thread is connectable to threaded portion 36. In the tightened state, nut 38 rests on clamp 34. Slotted opening 24 may be milled into holding portion 22, for example.

As is most readily apparent from FIG. 2, to allow tightening thereof, the bolt connection has a bracing portion 40 that is joined to bolt portion 30. Bracing portion 40 is preferably angled, in particular orthogonally relative to bolt portion 30, respectively to bolt connection axis SA. Bolt portion 30 and bracing portion 40 are preferably integrally formed in one piece. Together, bolt portion 30 and bracing portion 40 may also be referred to as a T-shaped element. Upon tightening of nut 38, clamp 34 is pressed against top or front side 26 of holding portion 22, and bracing portion 40 against rear side 28 of holding portion 22.

On front side 26 thereof, holding portion 22 features a convex portion 44 and a concave portion 46 that extend from a transition region 42. These two portions 44, 46 may be joined to one another by a straight portion 48. On rear side 28 thereof, holding portion 22 features a concave portion 50 and a convex portion 52 that extend from a transition region 42. Bracing portion 40 of the bolt connection is received in concave portion 50 on the rear side of holding portion 22. Bracing portion 40 preferably has a circular cross section, allowing it to rest by a part of the cylindrical outer surface thereof against concave portion 50 of the rear side of holding portion 22. The radius of curvature of concave portion 50 is preferably essentially equal in size to the radius of the circular cross section of the bracing portion.

Clamp 34 has a first bearing portion 54 that faces holding portion 22 of first component 12 and that features a first clamping face 56 that rests on first component 12, in particular on concave portion 46 of front side 26. First clamping face 56 is preferably curved, in particular convexly shaped. A positive connection between clamp 34 and holding portion 22 is also obtained due to the essentially complementary form of first clamping face 56 and concave portion 56 of front side 26 of holding portion 22. As a result, in the joined state, clamp 34 is reliably braced against the holding portion. In addition, clamp 34 has a second bearing portion 58 that faces the join region and has a second clamping face 60 that rests on second component 14. Second clamping face 60 preferably has an essentially flat form. In addition, clamp 34 has a central portion 62 joining first bearing portion 54 and second bearing portion 58. Central portion 62 preferably has a top side that faces away from holding portion 22 and is substantially flat.

In the joined state, overlapping portion 20 of the first component is pressed or pulled in join region 16 toward second bearing portion 58 of clamp 34. Overlapping portion 18 of second component 14 is hereby received and clamped in place between overlapping portion 20 and bearing portion 58. The acting clamping forces make possible a seal-tight connection between first component 12 and second component 14. Holding portion 22 is thereby also used as a type of bending bar in order to achieve a sufficient deformation upon clamping or tensioning of the coupling assembly, allowing a desired seal tightness to be obtained in join region 16, particularly under the influence of wear or thermal deformations.

From FIG. 3, it is also apparent, purely schematically, that fiber layers FL of holding portion 22 are placed to extend continuously therethrough. These continuous fiber layers provide holding portion 22 with the requisite stability and elasticity in order to achieve the desired clamping effect or tensioning of coupling assembly 10.

The coupling assembly presented here makes it possible for the same clamping effect to be achieved as in the case of a known variant having a soldered on stay bolt. Since the components of the coupling assembly are only tensioned against each other, and no material-to-material bonding (for example, soldering) is necessary, this coupling assembly may be used to secure CMC components to one another.

If first component 12 and second component 14 are frame elements of a hot gas-conducting annular duct of a turbine center frame of a gas turbine, the coupling assembly presented here eliminates the need for any metallic components to be in contact with the annular channel thus, to be wetted by hot gas. Metallic components, such as the bolt connection and the clamp, are located outside of the annular channel and merely exposed to the sealing air. If no metallic components are present in the annular channel, the hot gas temperature may also be increased.

Overall, therefore, for two components made of ceramic matrix composite, one obtains a coupling assembly that is very simple and inexpensive to manufacture. Two such components may also be joined together using a plurality of such coupling assemblies, as also indicated in FIG. 1.

REFERENCE NUMERAL LIST

10 coupling assembly
12 first component/first frame element
14 second component/second frame element
16 join region
18 overlapping portion of the first component
20 overlapping portion of the second component
22 holding portion
24 elongated opening
26 front side of the holding portion
28 rear side of the holding portion
30 bolt portion
32 opening of the clamp
34 clamp
36 threaded portion
38 nut
40 bracing portion
42 transition region
44 convex portion of the front side
46 concave portion of the front side
48 straight portion
50 concave portion of the rear side
52 convex portion of the rear side
54 first bearing portion
56 first clamping face
58 second bearing portion
60 second clamping face
62 central portion

What is claimed is:

1. A coupling assembly comprising:
a first component and a second component, the first component and the second component being configured to overlap one another in a join region;
a joining means in contact with the first component and the second component in a way that allows the first component and the second component to rest against each other clampingly in the join region, the joining means including a clamp resting on the first component and on the second component and having a bolt connection adapted for securing the clamp to the first and second component;
wherein the first component and the second component are made of a ceramic matrix composite, the first component having a holding portion including a front side facing the clamp, a rear side facing away from the clamp, and a receiving opening, and the bolt connection having a bolt portion extending through the receiving opening and, at a first end thereof facing away from the clamp, having an angled bracing portion angled relative to a longitudinal axis of the bolt portion and resting against the rear side of the holding portion; wherein, along the front side of the holding portion, the holding portion has a convex portion and a concave portion, the clamp being braced against the concave portion of the front side.

2. The coupling assembly as recited in claim 1 wherein, along the rear side of the holding portion, the holding portion has a rear side concave portion and a rear side convex portion, the bracing portion of the bolt connection being braced against the rear side concave portion.

3. The coupling assembly as recited in claim 1 wherein the receiving opening of the holding portion has a slotted design having an open end in a way that allows the bolt portion to be introduced through the open end into the receiving opening.

4. The coupling assembly as recited in claim 1 wherein the clamp has a first bearing portion facing the holding portion of the first component and has a first clamping face resting on the first component.

5. The coupling assembly as recited in claim 4 wherein on the concave portion of the front side, the first clamping face is curved to be convexly shaped.

6. The coupling assembly as recited in claim 1 wherein the clamp has a bearing portion facing the join region and has a clamping face resting on the second component.

7. The coupling assembly as recited in claim 6 wherein the clamping face has a flat form.

8. The coupling assembly as recited in claim 1 wherein the clamp has a first bearing portion facing the holding portion of the first component, a first clamping face resting on the first component, a second bearing portion facing the join region and a second clamping face resting on the second component, the clamp also having a central portion joining the first bearing portion and the second bearing portion, the central portion having a top side facing away from the holding portion and being flat.

9. The coupling assembly as recited in claim 1 wherein fiber layers of the ceramic matrix composite in the holding portion extend continuously through the holding portion.

10. The coupling assembly as recited in claim 1 wherein the bracing portion extends orthogonally relative to the longitudinal axis of the bolt portion.

11. A turbine center frame of a gas turbine having a hot gas-conducting annular duct, the turbine center frame comprising;

at least one first frame element;

at least one second frame element;

the coupling assembly as recited in claim 1; the first frame element forming the first component of ceramic matrix composite; and the second frame element forming the second component of ceramic matrix composite.

12. The turbine center frame as recited in claim 11 wherein the first frame element is a fairing of the turbine center frame and the second frame element is a panel of the turbine center frame.

13. The turbine center frame as recited in claim 11 wherein the join region between the first frame element and the second frame element seals the hot gas-conducting annular duct.

14. A gas turbine comprising the turbine center frame as recited in claim 11.

15. An aircraft gas turbine comprising the gas turbine as recited in claim 14.

* * * * *